(No Model.) 5 Sheets—Sheet 1.
E. R. KNOWLES.
STAND FOR CONTROLLING ELECTRIC CIRCUITS.
No. 508,626. Patented Nov. 14, 1893.
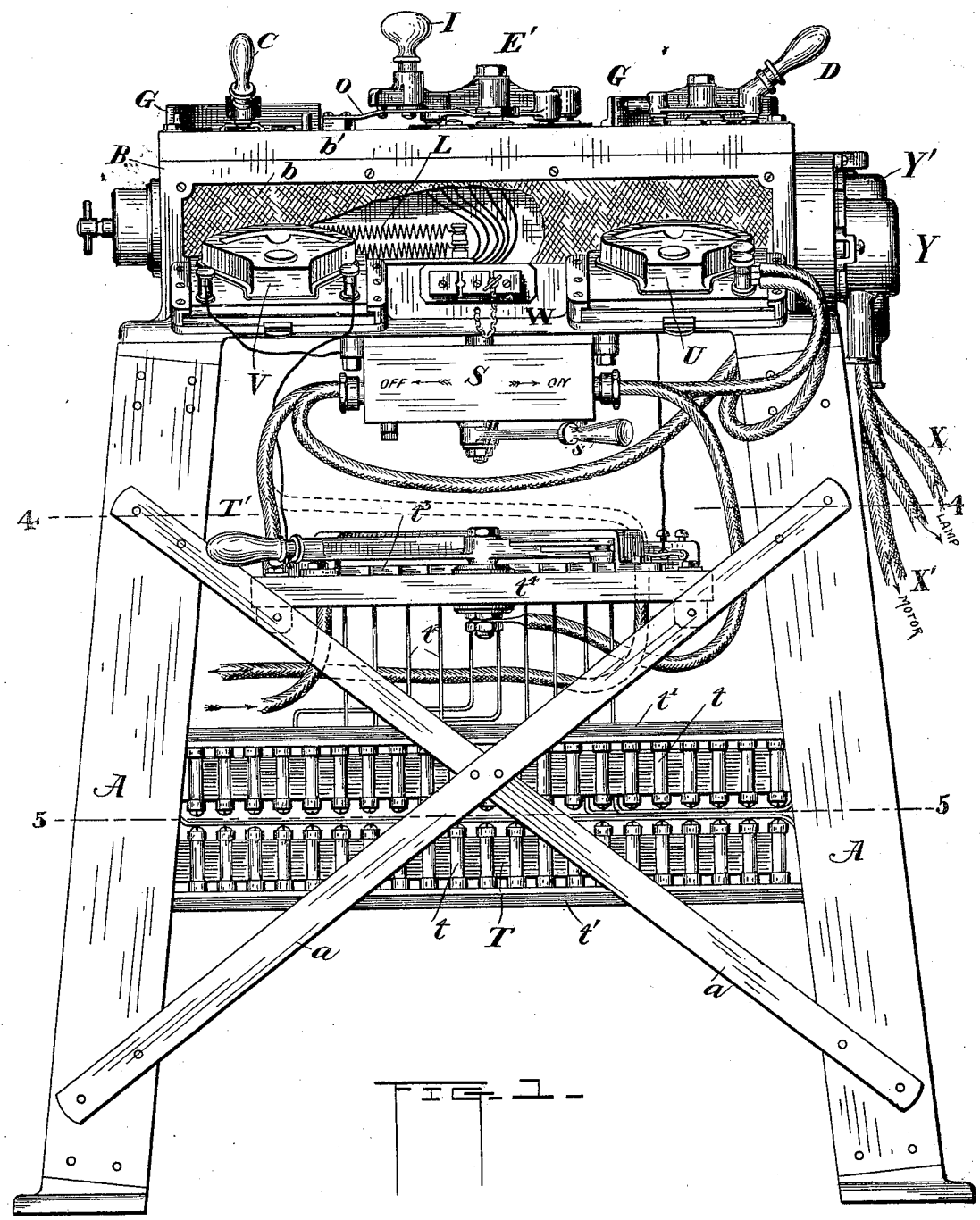
Witnesses:
Walter W. Lovegrove.
Paul L. Clark
Inventor:
Edward R. Knowles,
By Bentley & Blodgett,
Attys.

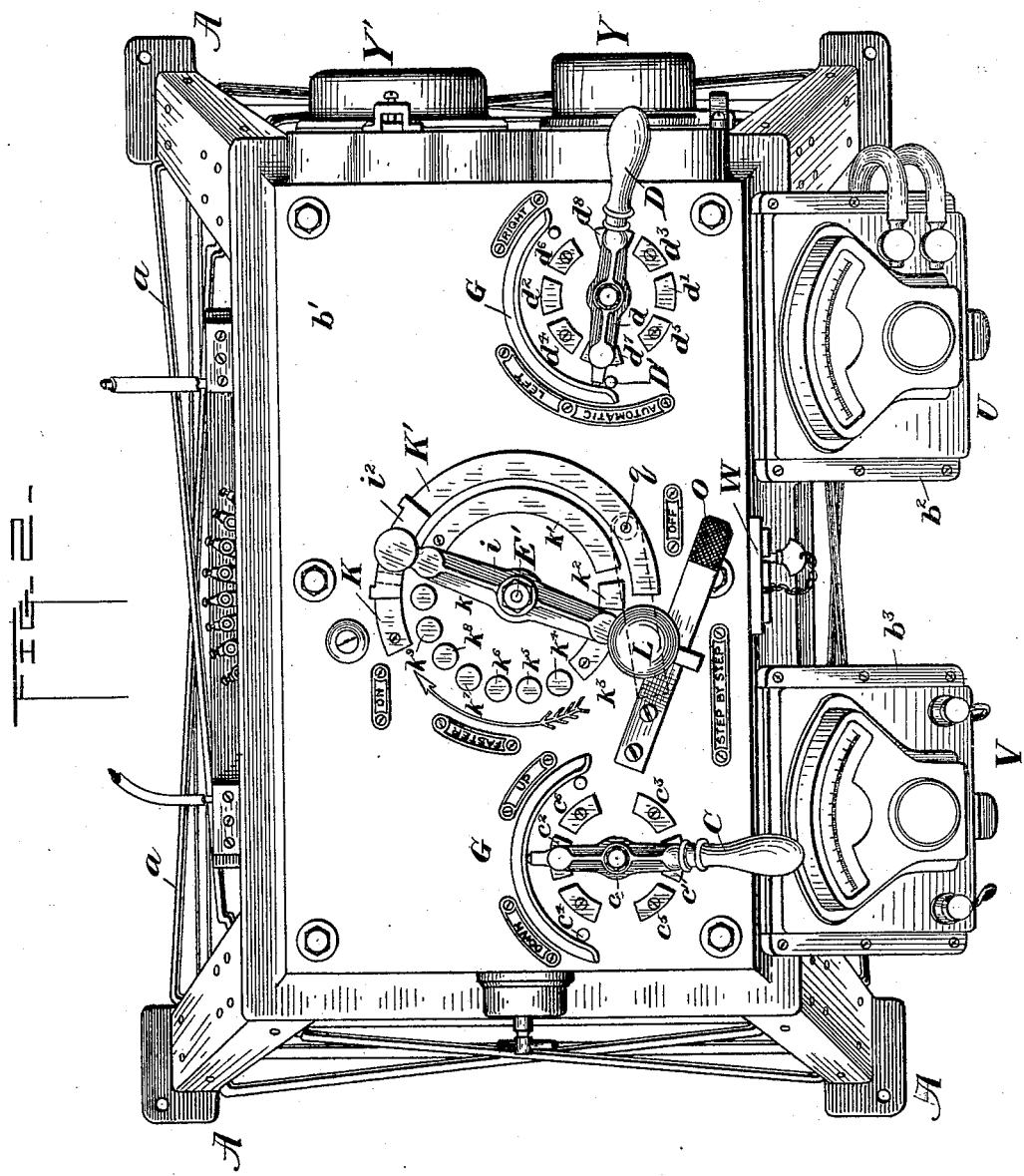

(No Model.) 5 Sheets—Sheet 3.
E. R. KNOWLES.
STAND FOR CONTROLLING ELECTRIC CIRCUITS.
No. 508,626. Patented Nov. 14, 1893.
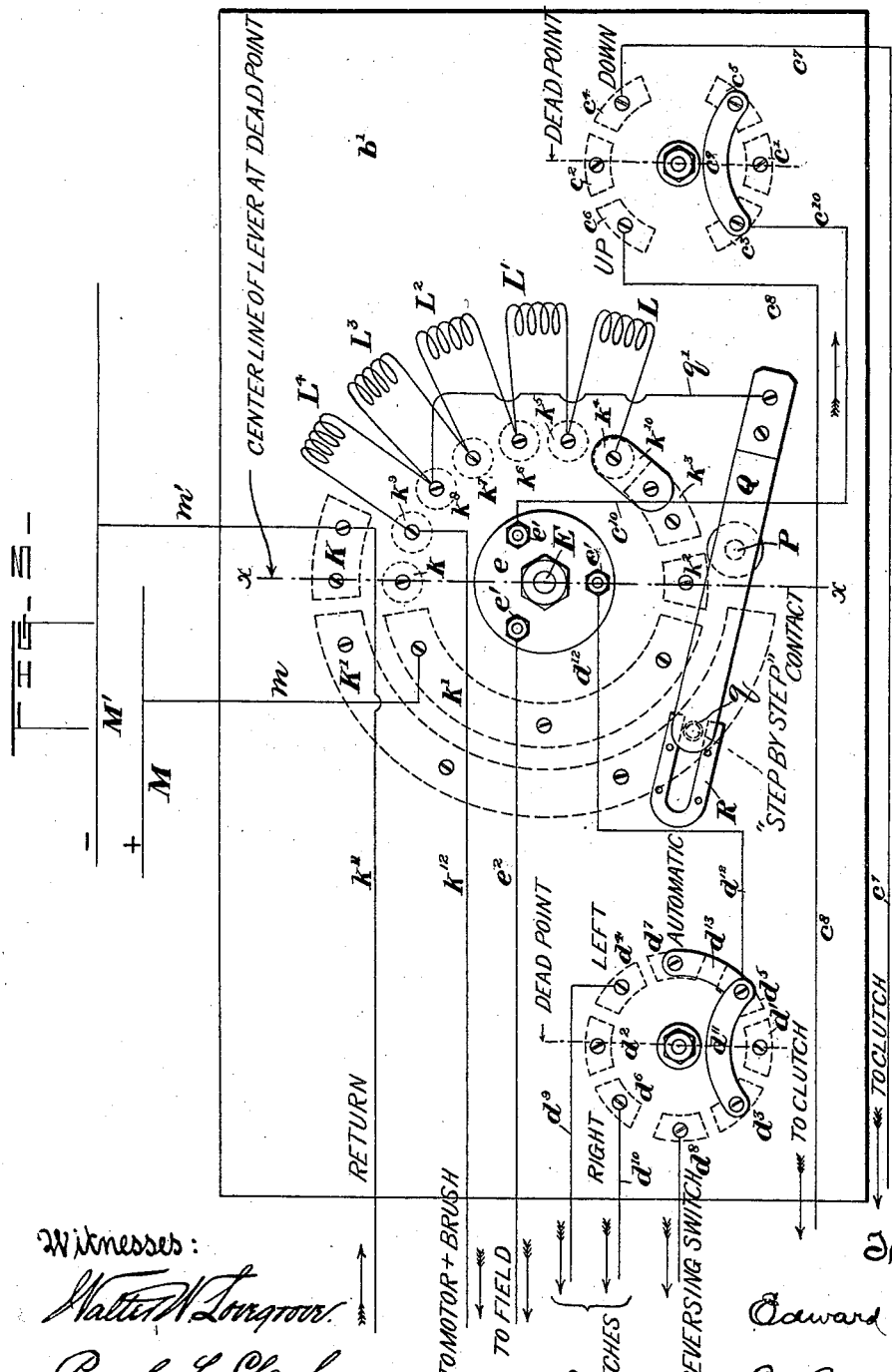

(No Model.) 5 Sheets—Sheet 4.
E. R. KNOWLES.
STAND FOR CONTROLLING ELECTRIC CIRCUITS.
No. 508,626. Patented Nov. 14, 1893.
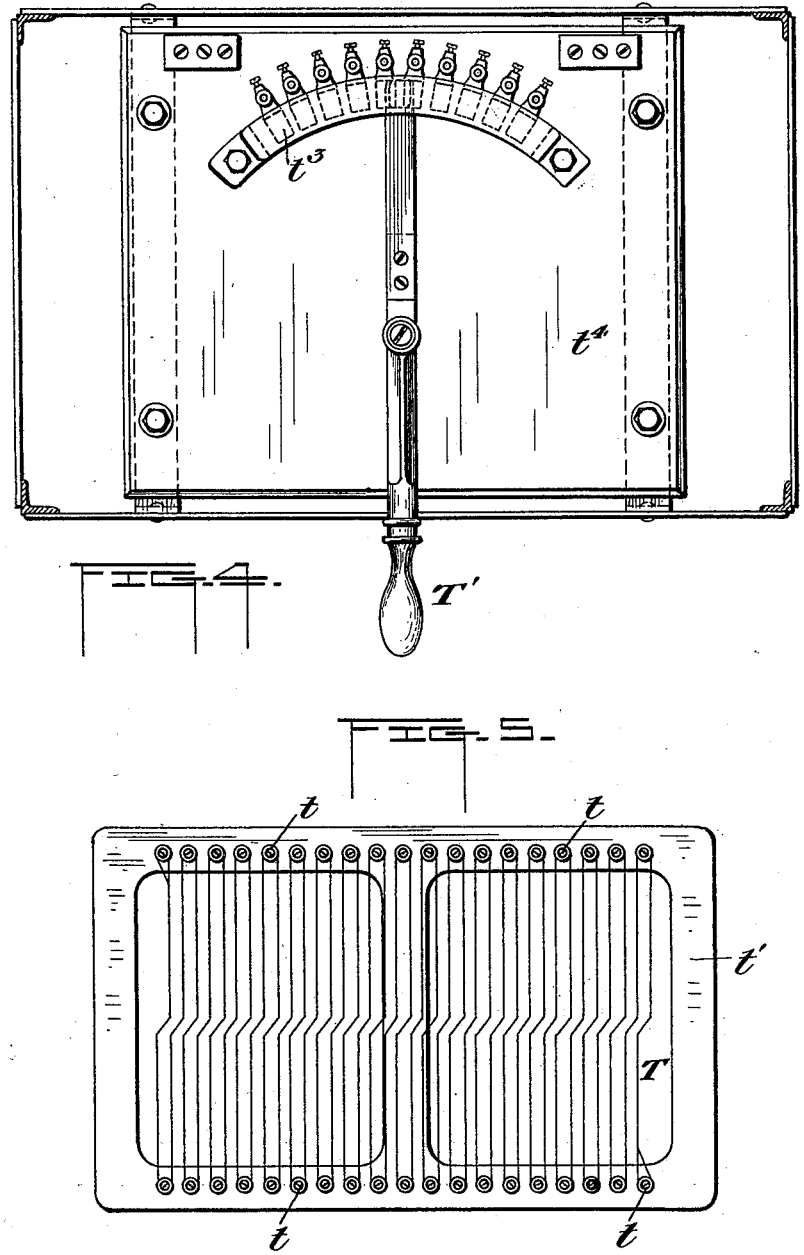

(No Model.)
5 Sheets—Sheet 5.
E. R. KNOWLES.
STAND FOR CONTROLLING ELECTRIC CIRCUITS.
No. 508,626. Patented Nov. 14, 1893.
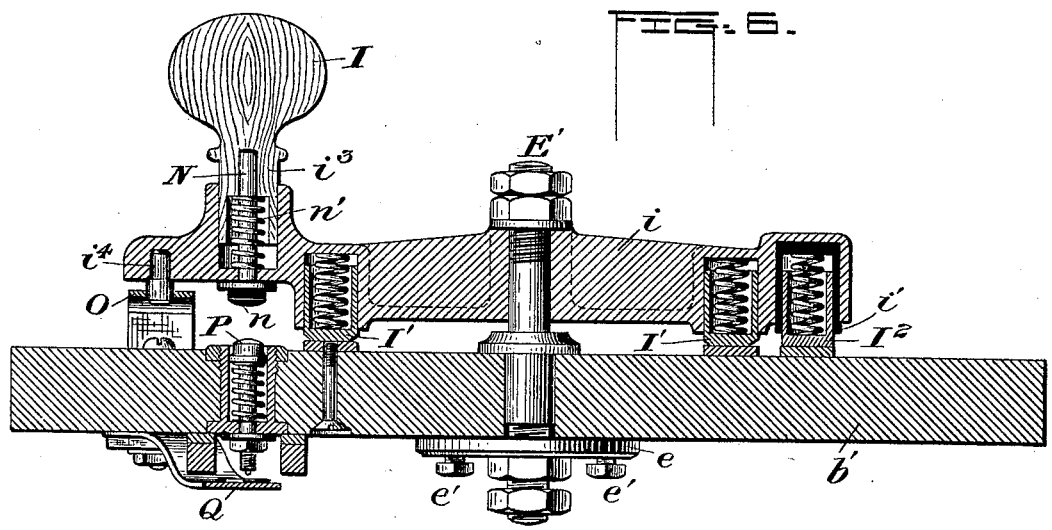
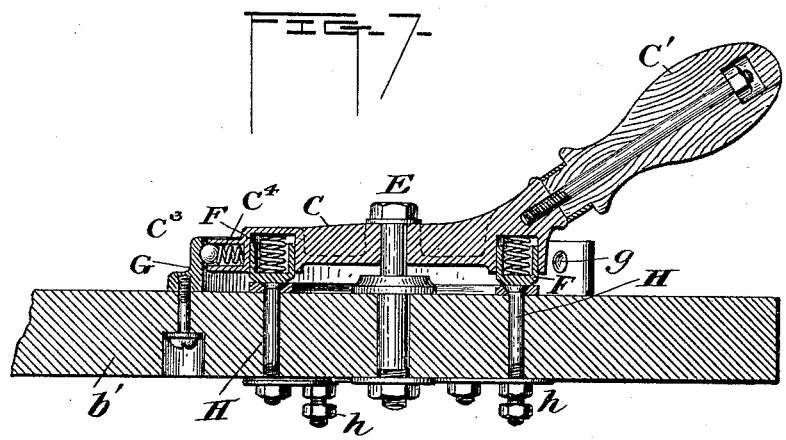
Witnesses.
Walter W. Longroot.
Paul L. Clark.
Inventor:
Edward R. Knowles
By Bentley & Blodgett,
Attys.

UNITED STATES PATENT OFFICE.

EDWARD R. KNOWLES, OF MIDDLETOWN, CONNECTICUT, ASSIGNOR TO THE SCHUYLER ELECTRIC COMPANY, OF CONNECTICUT.

STAND FOR CONTROLLING ELECTRIC CIRCUITS.

SPECIFICATION forming part of Letters Patent No. 508,626, dated November 14, 1893.

Application filed May 10, 1893. Serial No. 473,729. (No model.)

*To all whom it may concern:*

Be it known that I, EDWARD R. KNOWLES, a citizen of the United States, and a resident of Middleton, in the county of Middlesex and State of Connecticut, have invented certain new and useful Improvements in Stands for Controlling Electric Circuits, of which the following is a specification.

My invention relates to apparatus for controlling currents of electricity supplying power to translating devices, of any kind. It has been designed, however, for the special purpose of governing at a distance an electric search light, and for the sake of perspicuity I shall describe it in such connection. In the modern electric search light, the movements of the projector in azimuth and altitude are effected by mechanism, which includes one or more electric motors for actuating it when desired. It is desirable to be able to control these motors and the lamp, from a distant point, so that the light may be placed in some elevated or exposed position and yet be under the control of a person in a protected situation. This is especially desirable on a war ship or other naval vessel.

My invention consists in a stand in which are mounted the switches, rheostats and measuring instruments for controlling the motor or motors and the lamp, the connection between these translating devices and the controlling apparatus being made by means of flexible conductors when it is desired to render the projector or the stand, or both, relatively movable without interfering with the operation of the apparatus.

The novel features are hereinafter set forth and particularly pointed out in the claims.

In the drawings, Figure 1 is a front elevation. Fig. 2 is a top plan view. Fig. 3 is an inverted plan view of the top, showing the circuits. Fig. 4 is a plan on the line 4—4 Fig. 1. Fig. 5 is a plan on the line 5—5, Fig. 1. Fig. 6 is a section of the motor controlling switch and Fig. 7 is a section of one of the switches controlling the movements of the projector.

The stand is composed of four legs A, preferably of angle iron and braced by the diagonals $a$. The legs support a casing B, with open sides filled with wire netting $b$. The top $b'$ is preferably of insulating material such as slate. Upon the top are supported three switch handles, the middle one controlling the motor by means of a rheostat inclosed in the casing B, and the other two controlling respectively the vertical and horizontal movements of the projector. To one side of the casing are attached two slanting shelves which support the ammeter and the volt meter. Below the casing is a water tight switch for opening and closing the lamp circuit, the current in which is governed by a rheostat supported between the legs of the stand and governed by a switch handle just above it. A snap switch at the left hand end of the casing opens and closes the motor circuit.

This stand is designed especially to control such a search light as I have shown and described in my application, Serial No. 457,813, in which the movements of the projector are effected by an electric motor adapted to run continuously in the same direction, and provided with four shafts geared to the armature shaft so that two run in one direction and two in the opposite direction. There are two countershafts, one of which is geared to the mechanism for producing vertical movements of the projector, while the other is geared to the mechanism producing the horizontal movements. The motor contains four electric clutches, by means of which each countershaft can be coupled to one or another of the constantly running shafts, and thereby caused to rotate in either direction.

The switch handle C controls the two clutches which govern the countershaft producing the vertical movements of the projector, while the handle D controls the horizontal movements. These handles are precisely alike, each having a yoke $c\,d$ pivoted at its middle on the upright stud E, and having at each end in the under side a socket in which fits a spring contact pin or button F. At one end of the yoke is an insulating handle $C'$. Concentric with the stud E is an upright curved strip or wall G in which at the proper points are shallow pockets $g$. In the end of the yoke opposite the handle A is a socket containing a ball $C^3$ pressed outwardly by a spring $C^4$ against the strip G. When the yoke is turned to the proper position, the ball snaps into the pocket in the strip and locks the yoke, so that even in the dark the operator can tell when he has moved the switch far enough. By exerting a little extra force on the handle, the ball will ride out of the pocket, and the yoke can then be freely moved to another position. Concentric with the stud E are contact plates, six for the switch C and eight for the switch D. These plates lie under the pins F, which make constant contact with them. The plates are separated, so as to be insulated from each other. Plates $c'$ $c^2$ $d'$ $d^2$ are "dead points," that is, they are not in electric connection with any circuit, and serve merely to support the pins when the switches are open. They are not necessarily made of metal. Plates $c^4$, $c^6$, $d^4$, $d^6$, are metallic and are connected respectively with the four electric clutches by the wires $c^7$, $c^8$ $d^9$ $d^{10}$, and the pairs of diametrically opposite plates $c^3$ $c^5$ and $d^3$ $d^5$ are connected by the metallic bridges $c^9$ $d^{11}$ so that the four are electrically but two, each bridge being connected with a supply wire $c^{10}$ $d^{12}$. When the switch C is so turned as to make connection between the plates $c^3$ $c^4$, the clutch connected with plate $c^4$ is energized, and one of the countershafts is coupled to the motor in such a manner as to cause the beam of light from the projector to swing downward. When the switch is turned to the left into contact with plates $c^5$ $c^6$ the circuit is closed through another clutch, and the beam of light swings upward. In the same manner the movement of switch D to the right onto plates $d^3$ $d^4$ causes the light to sweep horizontally to the left, and vice versa, when the switch is turned to the left. By turning both switches at once, the light will be shifted vertically and horizontally at the same time.

The search light is provided with a reversing switch controlling the clutches which give the horizontal movement. This switch is arranged to be automatically operated by tappets on the moving part of the search light, as fully explained in my aforesaid application. When it is desired to bring this reversing switch into operation, the switch handle D is turned to the left until it brings up against a stop D', with its contact pins F resting on the plates $d^7$ $d^8$, the former of which is connected by a bridge $d^{13}$ with the plate $d^5$, and the supply wire $d^{12}$. The plate $d^8$ is in connection with the vibrating lever of the reversing switch, the two fixed contacts of said switch being respectively in connection with the two clutches which give the right and left horizontal movements to the projector. The plates are provided with suitable screw bolts H, which pass through the insulating top $b'$ and have suitable nuts $h$ to clamp the ends of the conductors. The bridges $c^9$, $d^{11}$ and $d^{13}$ are placed under the top $b'$ and fastened by suitable nuts on the bolts H.

The motor is controlled by the handle I having a yoke $i$ which swivels on the upright stud E' fixed in the top $b'$, and to the lower end of which is attached a plate $e$ provided with binding screws $e'$ for attaching the ends of the supply wires $c^{10}$ and $d^{12}$ and a supply wire $e^2$ feeding current to the field magnet coil of the motor. Concentric with the stud E' are the outer curved plates K K' and the inner plates $k$ $k'$ $k^2$ $k^3$ $k^4$ $k^5$ $k^6$ $k^7$ $k^8$ $k^9$, the plate $k'$ forming nearly a complete semi-circle parallel with the plate K'. At each end of the yoke $i$ is a spring contact pin I' resting upon the inner circle of plates. At the end of the yoke opposite the handle is a spring pin I² insulated by a bushing $i'$ from the yoke, and resting upon the outer plates K, K'. This pin has a long foot $i^2$ adapted to bridge the space between the plates K K', when necessary. The plates $k$ $k^2$ are "dead points" so that no current passes when the contact pins I' rest on them. The plates $k^3$ to $k^9$ inclusive are successively connected by the coils L, L', L², L³, L⁴ of a resistance inclosed in the casing B, and composed preferably of helical coils of German silver wire stretched between posts, as shown in Fig. 1. Plates $k^3$ and $k^4$ are connected by a bridge $k^{10}$ on the under side of the top $b'$. Plate $k'$ is connected by a sub-lead $m$ with the supply main M and plate K is connected by a sub-lead $m'$ with the return main M'. It is also connected with the wire $k^{11}$ which is the common return for the clutches and the motor. Plate $k^9$ is connected by wire $k^{12}$ with the motor. When the handle I is moved to the left, the plate $k'$ is put in connection with the plates $k^4$ $k^5$ $k^6$, &c., in succession. The current entering at $k'$ divides between the wires $c^{10}$ $d^{12}$ $e^2$ and plate $k^4$, passing from the latter to the motor through the rheostat and the wire $k^{12}$. As the handle moves farther around, the coils of the rheostat are successively cut out, and thus the current flowing through said wire to the motor is progressively increased and the speed of the motor accelerated. The motor is thus under complete control by means of the handle I.

It is sometimes desirable to be able to change the position of the light beam by small increments of movement thus giving it a step by step advance. In order to accomplish this without putting upon the clutches the strain of quickly repeated operation, a circuit closer is provided by means of which the current flowing to the motor can be controlled, after the proper clutch has been closed. I prefer to use the handle I for the circuit closer, providing it with a stem $i^3$ which slides vertically in a socket in the yoke $i$, and carries a plunger N having an insulated head $n$ projecting below the yoke. A spring $n'$ in the socket keeps the handle and plunger normally raised, as shown in Fig. 6. Secured to the top $b'$ is a flat spring arm O, adapted to engage with a stud $i^4$ on the yoke and hold it in the position in which it is shown in Fig. 2, with the foot $i^2$ bridging the space between the plates K K'. In the top $b'$ is a spring contact pin or push button P, which lies directly under the plunger N when the parts stand as shown in Fig. 2. The push button P depends below the top $b'$ and is arranged when depressed to contact with a flat spring Q secured to the under side of the top $b'$, and having at one end a contact point $q$ resting normally against the lower end of a bolt passing down from the plate K'. A permanent U-shaped magnet R is arranged with its poles straddling this contact point $q$. The spring Q is connected by a wire $q'$ with the plate $k^8$.

When the handle I stands as shown in Fig. 2, the current which flows from plate $k^7$ through the coils L, L', L², L³ is mostly diverted at plate $k^8$ into the short circuit $q'$, Q, $q$, K', $i^2$, K, $m'$, and so small a portion flows through coil L⁴ to the motor that the latter remains motionless. To start the motor, the handle I is pressed down, and the plunger N depresses the push button P, which strikes and depresses the spring Q, and thereby breaks the short circuit at the point $q$; the resulting arc being extinguished by the magnet R. The entire current passing through the resistance now flows to the motor, which runs as long as the handle I remains depressed. The beam of light can thus be moved either up or down, or to the right or left, by longer or shorter steps, as desired.

The lamp is controlled by a switch and a rheostat, the former being preferably a double pole switch inclosed in the box S and operated by a handle $s$, and the latter consisting of a ribbon T of German silver or other suitable material wound back and forth on pins $t$ inserted in a frame $t'$ supported between the legs of the stand. The several lengths of ribbon are preferably bent at or near their middle as shown in Fig. 5 to allow for expansion and contraction. From suitable points along the ribbon branch conductors $t^2$ run up to contact plates $t^3$ on an insulating shelf $t^4$ supported above this frame $t'$. A switch lever T' is fulcrumed on the shelf $t^4$ and is arranged to make contact with the plates $t^3$. The rheostat is in series with one side of the double pole switch S and with the ammeter U, which is supported on a small shelf $b^2$ on one side of the casing B. Another similar shelf $b^3$ supports the volt meter V, which by means of the three-plate plug switch W can be connected across either the lamp mains or the dynamo mains, as desired. The conductors leading to this lamp are bunched in a cable X running from a small contact box Y on one end of the casing B. The conductors for the motor and the clutches are similarly grouped in a cable X' leading from the contact box Y'. If desired, all the conductors may be gathered into a single cable.

Having thus described my invention, what I claim is—

1. In a stand for controlling electric circuits, the combination with a casing having a top of insulating material, of a rheostat inclosed in said casing, a circle of contact plates on said top, some of which are connected with said rheostat, a switch handle concentric with said plates, and two other switch handles one on each side of the rheostat handle, said latter handles each controlling two or more circuits separate from each other and from the circuit including the rheostat, substantially as described.

2. In a stand for controlling electric circuits, an insulating top provided with three circles of contact plates arranged in diametrically opposite pairs, one of said pairs in each circle being "dead points," a switch handle concentric with each circle and having at each end a contact pin, and means for locking one or more of said handles when its contact pins rest on any given pair of plates, said handles each controlling a separate circuit substantially as described.

3. In a stand for controlling electric circuits, a circle of contact plates, a curved strip concentric therewith, containing shallow pockets corresponding with said contact plates, a handle pivoted at the center of the circle, provided with a contact pin and having in one end a socket, and a spring pressed ball seated in said socket and adapted to ride into a pocket to lock the handle when its contact pin rests on a plate, substantially as described.

4. In a stand for controlling electric circuits, the combination with a switch handle D, of contact plates $d^3$ $d^8$ $d^6$ on one side of the normal position of the handle, contact plates $d^5$ $d^7$ $d^4$ on the opposite side, bridges $d^{11}$ $d^{13}$ connecting plates $d^3$ $d^5$ $d^7$, and separate circuits connected respectively with the plates $d^4$ $d^6$ $d^8$, substantially as described.

5. In a stand for controlling electric circuits, the combination with a switch handle carrying contact pins I' and an insulated pin I², of the concentric contact plates K, K' $k'$ $h^3$ $k^9$, a rheostat interposed between plates $k^3$ $k^9$, a short circuit around said rheostat to plate K', and a push button controlling said short circuit; substantially as described.

6. In a stand for controlling electric circuits, the combination with a switch handle carrying contact pins I', an insulated pin I² and a plunger N, of contact plates, a rheostat, a short circuit around said rheostat, and a push button controlling said short circuit and adapted to be operated by the plunger, substantially as described.

7. In a stand for controlling electric circuits, the combination with a switch handle carrying contact pins I' I², and spring plunger N, of a set of contact plates, a rheostat, a short circuit around said rheostat including a spring Q having a contact pin normally in circuit with one of said plates, a magnet straddling said pin, and a push button, adapted to be operated by said plunger and acting to bend this spring and thereby open the short circuit, substantially as described.

8. In a stand for controlling electric circuits, a switch handle having at each end a socket, a hollow pin sliding in each socket, and a spring housed inside the pin and between the ends of the socket and the pins, substantially as described.

9. In a stand for controlling electric circuits, a switch lever having at one end two spring contact pins, one of which is surrounded by an insulating bushing, and at the other end a spring contact pin and a spring plunger.

10. In an apparatus for controlling electric circuits, the combination with a supply main, of a switch adapted to connect said main with four or more separate parallel circuits, a resistance in one of said circuits, and two switches each adapted to connect one of the remaining circuits with one or another or two or more separate and parallel circuits, substantially as described.

11. In an apparatus for controlling electric circuits, the combination with a supply main, of a switch adapted to connect said main with four or more separate parallel circuits, a variable resistance in one of said circuits controlled by said switch, and two switches, each adapted to connect one of the remaining circuits with one or another or two or more separate circuits, substantially as described.

12. In an apparatus for controlling electric circuits, the combination with the supply main, of a switch adapted to connect said main with two or more separate parallel circuits, one including a resistance, a shunt around part of said resistance, and a normally closed circuit breaker in said shunt, substantially as described.

In testimony whereof I affix my signature in presence of two witnesses.

EDWARD R. KNOWLES.

Witnesses:
   D. J. GLAZIER,
   JOS. T. ELLIOTT.